United States Patent
Balachandran et al.

(10) Patent No.: US 9,542,171 B2
(45) Date of Patent: Jan. 10, 2017

(54) MANAGING AN APPLICATION MODIFICATION PROCESS

(71) Applicants: Biju Balachandran, Bangalore (IN); Niraj Kumar, Bangalore (IN)

(72) Inventors: Biju Balachandran, Bangalore (IN); Niraj Kumar, Bangalore (IN)

(73) Assignee: SAP SE, Walldorf (DE)

( * ) Notice: Subject to any disclaimer, the term of this patent is extended or adjusted under 35 U.S.C. 154(b) by 283 days.

(21) Appl. No.: 13/720,016

(22) Filed: Dec. 19, 2012

(65) Prior Publication Data
US 2014/0173587 A1   Jun. 19, 2014

(51) Int. Cl.
G06F 9/44 (2006.01)
G06F 9/445 (2006.01)

(52) U.S. Cl.
CPC . G06F 8/65 (2013.01); G06F 8/60 (2013.01); G06F 8/70 (2013.01); G06F 8/61 (2013.01)

(58) Field of Classification Search
CPC ............... G06F 8/60; G06F 8/65; G06F 8/70; G06F 8/61
USPC .......................................................... 717/173
See application file for complete search history.

(56) References Cited

U.S. PATENT DOCUMENTS

| | | | |
|---|---|---|---|
| 6,006,034 A * | 12/1999 | Heath et al. ................. | 717/170 |
| 8,832,180 B2 | 9/2014 | Balachandran et al. | |
| 2005/0027822 A1* | 2/2005 | Plaza ........................... | 709/218 |
| 2006/0168574 A1* | 7/2006 | Giannini et al. ............. | 717/168 |
| 2010/0021870 A1* | 1/2010 | Patten et al. ................ | 434/118 |
| 2014/0196020 A1 | 7/2014 | Shetty et al. | |

* cited by examiner

*Primary Examiner* — Viva Miller
(74) *Attorney, Agent, or Firm* — Fish & Richardson P.C.

(57) ABSTRACT

Techniques for managing application maintenance include receiving, from a user in an on-premise computing environment that includes a client landscape, a request to perform an application maintenance process for an application operable in the client landscape; initiating a communication to an on-demand computing environment, the communication including a description of the application maintenance process; receiving a plan of the application maintenance process from the on-demand computing environment, the plan including one or more links to media for completing the application maintenance process; obtaining the media through the one or more links in the plan; and initiating the application maintenance process with at least a portion of the obtained media from the client landscape in the on-premise computing environment.

21 Claims, 4 Drawing Sheets

US 9,542,171 B2

MANAGING AN APPLICATION MODIFICATION PROCESS

TECHNICAL BACKGROUND

This disclosure relates to managing an application modification process.

BACKGROUND

An organization that performs software development can setup, manage and operate a landscape of multiple applications at a client's site. For the setup, management and operation of the applications, an IT administrator performs a variety of software logistics processes (e.g., installation, copy, configuration, update, upgrade, etc.). Generally, each application has a unique software logistics processes, requiring a particular set of knowledge and expertise. The complexity and the breadth of knowledge and expertise required to perform software logistics processes for multiple applications, increases with the number of applications, which can possibly lead to media breaks.

Often during execution of software logistics processes, errors and other exceptions may occur. For example, hardware or software malfunctions may occur. As another example, the IT administrator or system may have a certain expectation of a remote system (e.g., an expectation of an available memory or processing capability thereof), which may be at least temporarily incorrect, so that the remote system may not be able to perform a desired or expected functionality. When an error occurs at a particular level of the software logistics processes, the results may or may not affect subsequent processes (e.g., may affect some subsequent tasks, but not all). Consequently, by reducing the complexity and the breadth of knowledge and expertise required to perform software logistics processes for multiple applications such exceptions could be minimized and easier managed.

SUMMARY

In one general embodiment, techniques for managing application maintenance include receiving, from a user in an on-premise computing environment that includes a client landscape, a request to perform an application maintenance process for an application operable in the client landscape; initiating a communication to an on-demand computing environment, the communication including a description of the application maintenance process; receiving a plan of the application maintenance process from the on-demand computing environment, the plan including one or more links to media for completing the application maintenance process; obtaining the media through the one or more links in the plan; and initiating the application maintenance process with at least a portion of the obtained media from the client landscape in the on-premise computing environment.

In a first aspect combinable with the general embodiment, the application maintenance process includes at least one of an application installation process or an application update process.

In a second aspect combinable with any of the previous aspects, the description of the application maintenance process includes at least one of an application name, an application version, or an application service pack.

In a third aspect combinable with any of the previous aspects, the plan is generated at the on-demand computing environment that includes a repository that stores or references the media for completing the application maintenance process.

A fourth aspect combinable with any of the previous aspects further includes initiating a simulation of the application maintenance process at the on-demand computing environment; and receiving at least a portion of the simulation at the on-premise computing environment, the simulation including a description of one or more changes to the client landscape based on the application maintenance process.

A fifth aspect combinable with any of the previous aspects further includes querying, with a process handler at the on-premise computing environment, a state of the application operable in the client landscape; and providing, in the description of the application maintenance process, the state of the application, the plan including one or more links to media for completing the application maintenance process based on the state of the application.

In a sixth aspect combinable with any of the previous aspects, initiating the application maintenance process includes initiating a first portion of the application maintenance process.

A seventh aspect combinable with any of the previous aspects further includes initiating a second portion of the application maintenance process subsequent to the first portion with another portion of the obtained media from the client landscape in the on-premise computing environment.

Various embodiments of a process handler according to the present disclosure may have one or more of the following features. For example, the process handler provides the IT administrator with a capability that abstracts the underlying complexity of dealing with multiple tools/runtimes across different logistical management processes. The process handler can orchestrate steps like finding the right content to use for a specific scenario, where and how to download the content from, how to deploy this to the enterprise system, which tool to use and how to trigger the tool, therefore resulting in unified experience and minimal or even no media breaks.

These general and specific aspects may be implemented using a device, system or method, or any combinations of devices, systems, or methods. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions. The details of one or more embodiments are set forth in the accompanying drawings and the description below. Other features, objects, and advantages will be apparent from the description and drawings, and from the claims.

DETAILED DESCRIPTION

This disclosure describes systems, methods, apparatus, and computer-readable media for standardly managing on-premise systems including multiple applications (e.g., software tools) in an on-premise computing environment. The standardized management of multiple applications can be realized by using application maintenance process plans retrieved from an on-demand computing environment. In particular, embodiments include an interactive request to perform a maintenance process for a particular application operable in a client landscape. In some instances, the request can refer to a software logistics process (e.g., installation, copy, configuration, update, upgrade, etc.).

In some embodiments, the interactive request is initiated by a user in an on-premise computing environment that includes a client landscape. In some embodiments the user performs a standard protocol corresponding to a particular type of software logistics process, which is applicable to multiple applications. For instance, the user of the on-premise computing environment can use the same installation protocol for multiple applications operable in the client landscape.

In some embodiments, the request to perform an application maintenance process could initiate a communication to an on-demand computing environment. Through the communication between the on-premise computing environment and the on-demand computing environment, the user can receive a plan of the application maintenance process. For example, the plan can include one or more links to media for completing the application maintenance process. The plan can be designed to be compatible with the standard protocol for a particular software logistics process, without requiring knowledge specific to a particular application.

Figure 1:
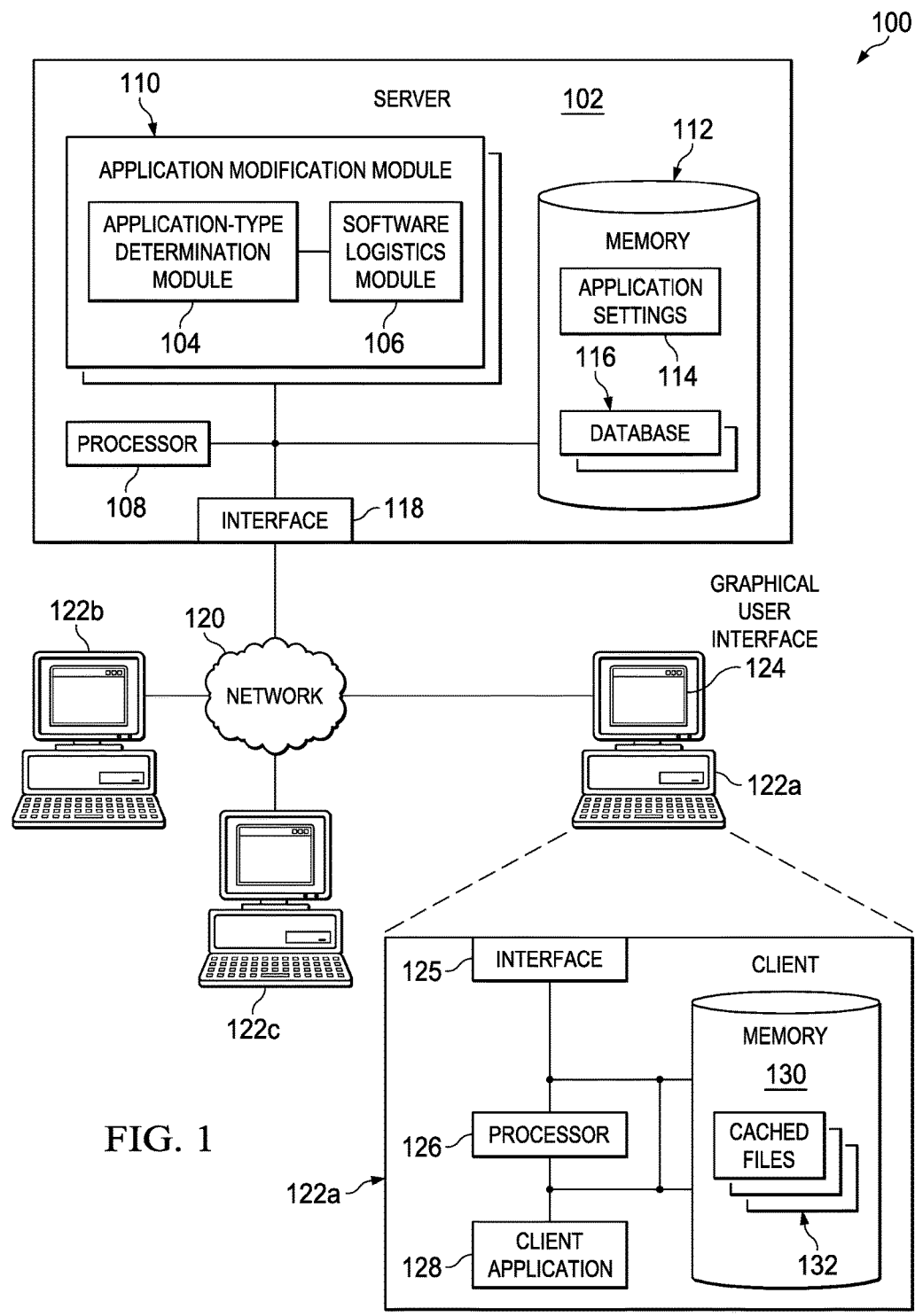
FIG. 1 illustrates an example distributed computing system operable to match one or more strings of characters.

Turning to the example implementation of FIG. 1, the illustrated environment 100 includes or is communicably coupled with server 102 and one or more clients 122, at least some of which communicate across a network 120. In general, environment 100 depicts an example configuration of a system capable of retrieving application maintenance process plans from the server 102, in response to requests from its clients 122.

In general, the server 102 can be an on-demand computing environment that stores one or more application modification module 110, where at least a portion of the application modification module 110 are executed via requests and responses sent to users or clients 122 within and communicably coupled to the illustrated environment 100 of FIG. 1. In some instances, the server 102 may store a plurality of various application modification modules 110, while in other instances, the server 102 may be a dedicated server meant to store and execute only a single application modification module 110.

In some instances, the server 102 may comprise a web server, where the application modification module 110 represents one or more web-based applications accessed and executed via network 120 by the clients 122 of the system to perform the programmed tasks or operations of the application modification module 110. At a high level, the server 102 comprises an electronic computing device operable to receive, transmit, process, store, or manage data and information associated with the environment 100. Specifically, the server 102 illustrated in FIG. 1 is responsible for receiving application requests from one or more client applications 128 associated with the clients 122 of environment 100 and responding to the received requests by processing said requests in the associated application modification module 110, and sending the appropriate response from the application modification module 110 back to the requesting client application 128.

In addition to requests from the external clients 122 illustrated in FIG. 1, requests associated with the application modification module 110 may also be sent from internal users, external or third-party customers, other automated applications, as well as any other appropriate entities, individuals, systems, or computers. As used in the present disclosure, the term "computer" is intended to encompass any suitable processing device. For example, although FIG. 1 illustrates a single server 102, environment 100 can be implemented using two or more servers 102, as well as computers other than servers, including a server pool. Indeed, server 102 may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, illustrated server 102 may be adapted to execute any operating system, including Linux, UNIX, Windows, Mac OS, or any other suitable operating system. According to one embodiment, server 102 may also include or be communicably coupled with a mail server.

In the present implementation, and as shown in FIG. 1, the server 102 includes a processor 108, one or more application modification modules 110, a memory 112 and an interface 118. The interface 118 is used by the server 102 for communicating with other systems in a client-server or other distributed environment (including within environment 100) connected to the network 120 (e.g., client 122, as well as other systems communicably coupled to the network 120). Generally, the interface 118 comprises logic encoded in software and/or hardware in a suitable combination and operable to communicate with the network 120. More specifically, the interface 118 may comprise software supporting one or more communication protocols associated with communications such that the network 120 or interface's hardware is operable to communicate physical signals within and outside of the illustrated environment 100.

Generally, the network 120 facilitates wireless or wireline communications between the components of the environment 100 (i.e., between the server 102 and the clients 122), as well as with any other local or remote computer, such as additional clients, servers, or other devices communicably coupled to network 120 but not illustrated in FIG. 1. The network 120 is illustrated as a single network in FIG. 1, but may be a continuous or discontinuous network without departing from the scope of this disclosure, so long as at least a portion of the network 120 may facilitate communications between senders and recipients.

The network 120 may be all or a portion of an enterprise or secured network, while in another instance at least a portion of the network 120 may represent a connection to the Internet. In some instances, a portion of the network 120 may be a virtual private network (VPN), such as, for example, the connection between the client 122 and the server 102. Further, all or a portion of the network 120 can comprise either a wireline or wireless link. Example wireless links may include 802.11a/b/g/n, 802.20, WiMax, and/or any other appropriate wireless link. In other words, the network 120 encompasses any internal or external network, networks, sub-network, or combination thereof operable to facilitate communications between various computing components inside and outside the illustrated environment 100. The network 120 may communicate, for example, Internet Protocol (IP) packets, Frame Relay frames, Asynchronous Transfer Mode (ATM) cells, voice, video, data, and other suitable information between network addresses. The network 120 may also include one or more local area networks (LANs), radio access networks (RANs), metropolitan area networks (MANs), wide area networks (WANs), all or a portion of the Internet, and/or any other communication system or systems at one or more locations.

As illustrated in FIG. 1, server 102 includes a processor 108. Although illustrated as a single processor 108 in FIG. 1, two or more processors may be used according to particular needs, desires, or particular embodiments of environment 100. Each processor 108 may be a central processing unit (CPU), a blade, an application specific integrated circuit (ASIC), a field-programmable gate array (FPGA), or another suitable component. Generally, the processor 108 executes instructions and manipulates data to perform the operations of server 102 and, specifically, the one or more plurality of application modification module 110. Specifically, the server's processor 108 executes the functionality required to receive and respond to requests from the clients 122 and their respective client applications 128, as well as the functionality required to perform the other operations of the application modification module 110.

Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate. Conversely, the features and functionality of various components can be combined into single components as appropriate. In the illustrated environment 100, processor 108 executes one or more application modification modules 110 on the server 102.

At a high level, each of the one or more application modification module 110 is any application, program, module, process, or other software that may execute, change, delete, generate, or otherwise manage information according to the present disclosure, particularly in response to and in connection with one or more requests received from the illustrated clients 122 and their associated client applications 128. In certain cases, only one application modification module 110 may be located at a particular server 102. In others, a plurality of related and/or unrelated application modification modules 110 may be stored at a single server 102, or located across a plurality of other servers 102, as well. In certain cases, environment 100 may implement a composite application modification module 110. For example, portions of the composite application may be implemented as Enterprise Java Beans (EJBs) or design-time components may have the ability to generate run-time implementations into different platforms, such as J2EE (Java 2 Platform, Enterprise Edition), ABAP (Advanced Business Application Programming) objects, or Microsoft's .NET, among others. Additionally, the application modification module 110 may represent web-based applications accessed and executed by remote clients 122 or client applications 128 via the network 120 (e.g., through the Internet). Further, while illustrated as internal to server 102, one or more processes associated with a particular application modification module 110 may be stored, referenced, or executed remotely. For example, a portion of a particular application modification module 110 may be a web service associated with the application that is remotely called, while another portion of the application modification module 110 may be an interface object or agent bundled for processing at a remote client 122. Moreover, any or all application modification modules 110 may be a child or sub-module of another software module or enterprise application (not illustrated) without departing from the scope of this disclosure. Still further, portions of the application modification module 110 may be executed by a user working directly at server 102, as well as remotely at client 122.

At least one of the application modification module 110 are capable of supporting application maintenance management. In some instances, the application modification module 110 may generate or retrieve from the database 116 in the memory 112 a plan for the application maintenance process. The application modification module 110 may be designed or appropriate for multiple types of applications, such that each time a particular plan for the application maintenance process, is required by the client 122 the request is executed by the server 102.

In some instances, the application modification module 110 may be generated from a plurality of individual components, each performing specific and/or distinct activities to allow the application modification module 110 to function. As illustrated, the application modification module 110 may include two modules: an application-type determination module 104 and a software logistics module 106. These modules may be embedded within the application modification module 110 as shown in FIG. 1, or instead may be communicably coupled to the application modification module 110 within the server 102. In still further instances, either or both of the modules may be located external to the server 102 and perform their relative functionality through communications and interactions facilitated by network 120. Each module may be an agent, daemon, object, service, plug-in, or other software capable of performing the respective module's functionality and operations. Additionally, each module may simply represent a portion of the application's 110 programming, such that the module itself is inseparable from or an integral part of the application modification module 110.

Turning to the first of the two modules, the application-type determination module 104 is used by an application modification module 110 in FIG. 1 to determine the type of application corresponding to a particular request, or series of requests, received from a client 122 or client application 128. In some instances, the application-type determination module 104 may receive explicit instructions from a request to execute the application modification module 110 in a certain mode. For instance, the client 122 may explicitly state a description of the application maintenance process for which the application modification module 110 must determine a plan of the application maintenance process. The application-type determination module 104 can analyze the description of the application maintenance process to identify the application type, for which the plan must be retrieved.

The second module of the application modification module 110, the software logistics module 106, performs the operations associated with the application modification module 110 that are to be sent to the client 122 in the responses used for the execution of a particular software logistics. In some instances, the software logistics module 106 will receive explicit instructions from a request to execute the application modification module 110 in a certain mode. For instance, the client 122 may explicitly state a description of the application maintenance process for which the application modification module 110 must determine a plan of the application maintenance process. The software logistics module 106 can analyze the description of the application maintenance process to identify the software logistics, for which the plan must be retrieved. In some implementations, the application-type determination module 104 is communicably coupled to the software logistics module 106 to enable the application modification module 110 to extract the associated elements defining a particular plan of the application maintenance process.

The server 102 also includes memory 112. Memory 112 may include any memory or database module and may take the form of volatile or non-volatile memory including, without limitation, magnetic media, optical media, random access memory (RAM), read-only memory (ROM), removable media, or any other suitable local or remote memory component. Memory 112 may store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the server 102 and its one or more application modification module 110. Additionally, memory 112 may include any other appropriate data, such as VPN applications, firmware logs and policies, firewall policies, a security or access log, print or other reporting files, as well as others.

Specifically, illustrated memory 112 includes a set of application settings 114 and a database 116. Although illustrated within memory 112, some or all of the illustrated elements may be located or stored outside of memory 112 and/or server 102 (e.g., in different memories and/or on multiple different servers, as well as in other locations external to, but communicably coupled with, environment 100). For example, the set of application settings 114 may be included within the programming of each associated application modification module 110 such that the settings are inherent to the application modification module 110 itself. Additionally, some or all of the set of application settings 114 may be stored at and specific to a particular client 122, and stored in the client's respective memory. In those instances, particular settings stored at the client 122 can be sent along with the requests to the application modification module 110 in order to allow the application modification module 110 to be initialized and executed in accordance with the proper settings. In general, the set of application settings 114 may include information such as the preferred modes of operation of a particular application for various requests and operations. This information can then be accessed by the application-type determination module 104 when requests are received and used to determine the plan of the application maintenance process. Additionally, any other information relevant to the particular application modification module 110 can be stored in and included with the set of application settings 114 in particular embodiments.

Illustrated memory 112 also includes a database 116 representing the stored plans of the application maintenance process or information stored for deriving a plan of the application maintenance process. Specifically, information representing the application's particular state is accessed by the application modification module 110 as requests are received, and updated as those requests are processed and events occur. In order to preserve memory space, all or a portion of the database 116 may be associated with a particular timeout value, such that specific portions of the database 116 acts as temporary storage of the application modification module 110 state information. If, after sending the response, the application modification module 110 receives an additional request from the client 122 before the end of the timeout value, state information from the database 116 may be accessed and used instead of the state information included with the client's request.

The illustrated environment of FIG. 1 also includes one or more clients 122. Each client 122 may be any computing device operable to connect to or communicate with at least the server 102 and/or via the network 120 using a wireline or wireless connection. Further, as illustrated by client 122a, each client 122 includes a processor 126, an interface 125, a graphical user interface (GUI) 124, a client application 128, and a memory 130. In general, each client 122 comprises an electronic computer device operable to receive, transmit, process, and store any appropriate data associated with the environment 100 of FIG. 1. It will be understood that there may be any number of clients 122 associated with, or external to, environment 100. For example, while illustrated environment 100 includes three clients (122a, 122b, and 122c), alternative implementations of environment 100 may include a single client 122 communicably coupled to the server 102, or any other number suitable to the purposes of the environment 100.

Additionally, there may also be one or more additional clients 122 external to the illustrated portion of environment 100 that are capable of interacting with the environment 100 via the network 120. Further, the term "client" and "user" may be used interchangeably as appropriate without departing from the scope of this disclosure. Moreover, while each client 122 is described in terms of being used by a single user, this disclosure contemplates that many users may use one computer, or that one user may use multiple computers. As used in this disclosure, client 122 is intended to encompass a personal computer, touch screen terminal, workstation, network computer, kiosk, wireless data port, smart phone, personal data assistant (PDA), one or more processors within these or other devices, or any other suitable processing device. For example, each client 122 may comprise a computer that includes an input device, such as a keypad, touch screen, mouse, or other device that can accept user information, and an output device that conveys information associated with the operation of the server 102 (and application modification module 110) or the client 122 itself, including digital data, visual information, the client application 128, or the interface 125. Both the input and output device may include fixed or removable storage media such as a magnetic storage media, CD-ROM, or other suitable media to both receive input from and provide output to users of the clients 122 through the display, namely, the interface 125.

As indicated in FIG. 1, client 122a is specifically associated with an administrator of the illustrated environment 100. A client 122a (e.g., administrator) can modify various settings associated with one or more of the other clients 122, the server 102, the application modification module 110, and/or any relevant portion of environment 100. For example, the client 122a may be able to modify the relevant timeout values associated with each application modification module 110, as well as any of the set of application settings 114, including those associated with the application-type determination module 104 or software logistics module 106 of the application modification module 110.

Each client 122 can include a client application 128 associated with the application modification module 110. In particular, the client application 128 is any software, such as a web browser or remote portion of the application modification module 110 that allows the client 122 to access and work with the application modification module 110. Particularly, the client application 128 is a software application that enables the client 122 (or a user thereof) to display and interact with one or more of the application modification module 110 executed at the server 102. Where the application modification module 110 are web-based applications, the client application 128 may be specific applications dedicated to use with a particular application modification module 110, a general web browser with adequate functionality to interact with the application modification module 110, or any other appropriate software.

Further, the illustrated client 122 includes an interface 125 comprising a graphical user interface operable to interface with at least a portion of environment 100 for any suitable purpose, including generating a visual representation of the client application 128 (in some instances, the client's web browser) and the interactions with the application modification module 110, including the responses received from the application modification module 110 received in response to the requests sent by the client application 128. Generally, through the interface 125, the user is provided with an efficient and user-friendly presentation of data provided by or communicated within the system. The term "graphical user interface," or GUI, may be used in the singular or the plural to describe one or more graphical user interfaces and each of the displays of a particular graphical user interface. Therefore, the interface 125 can represent any graphical user interface, including but not limited to, a web browser, touch screen, or command line interface (CLI) that processes information in environment 100 and efficiently presents the information results to the user.

In general, the interface 125 may include a plurality of user interface (UI) elements, some or all associated with the client application 128, such as interactive fields, pull-down lists, and buttons operable by the user at client 122. These and other UI elements may be related to or represent the functions of the client application 128, as well as other software applications executing at the client 122. In particular, the interface 125 may be used to present the client-based perspective of the application modification module 110, and may be used (as a web browser or using the client application 128 as a web browser) to view and navigate the application modification module 110, as well as various web pages located both internal and external to the server, some of which may be associated with the application modification module 110. For purposes of the present location, the interface 125 may be a part of or the entirety of the client application 128, while also merely a tool for displaying the visual representation of the client and applications' 110 actions and interactions. In some instances, the interface 125 and the client application 128 may be used interchangeably, particularly when the client application 128 represents a web browser associated with the application modification module 110.

The illustrated clients 122 can access an on-premise computing environment, including an interface 125 and a processor 126. The interface 125 of each client 122 may be similar to the interface 118 of the server 102, in that it may comprise logic encoded in software and/or hardware in a suitable combination and operable to communicate with the network 120. More specifically, interface 125 may comprise software supporting one or more communication protocols such that the network 120 or hardware is operable to communicate physical signals to and from the client 122. The client's processor 126 may also be similar in nature to that of the server's processor 108. Again, although only illustrated as a single processor 126, two or more processors may be used according to particular needs, desires, or embodiments of environment 100. Similar to the server's processor 108, each client processor 126 may be a central processing unit (CPU), a blade, an application specific integrated circuit (ASIC), a field-programmable gate array (FPGA), or another suitable component. Generally, the processor 126 executes instructions and manipulates data to perform the operations of the client 122 and, specifically, the associated client application 128 described above. Specifically, the client's processor 126 executes the functionality required to send requests from the client 122 and its client application 128, as well as receive and process the associated responses from the application modification module 110.

Each client 122 also includes a memory 130. Memory 130 may be similar to the server's memory 112, and may include any memory or database module, taking the form of either volatile or non-volatile memory including, without limitation, magnetic media, optical media, random access memory (RAM), read-only memory (ROM), removable media, or any other suitable local or remote memory component. For example, memory 130 may store backup data, parameters, cookies, variables, algorithms, instructions, rules, or references thereto, as well as any other suitable data.

As specifically illustrated, memory 130 includes a set of cached files 132 associated with the client application 128. The set of cached files 132 is used by the client application 128 to cache, or store, state information associated with the responses received from the application modification module 110 during client-application interactions. In some instances, the set of cached files 132 may store only the most recent state information associated with the application modification module 110, while in other instances, the set of cached files 132 may store additional information about previous application states, thereby allowing the client application 128 to "go back" to previous states if the user is so inclined. The set of cached files 132 may represent the only stored set of state information associated with an executed application maintenance process. Therefore, loss of the data stored in the set of cached files 132 without an adequate backup copy would result in a loss of the application maintenance process for a particular user. When the client application 128 generates a request to be sent to the application modification module 110, the client application 128 can access the set of cached files 132 to retrieve and integrate the application's current state information into the request prior to transmission to the application modification module 110 and generation of a plan of the application maintenance process.

While FIG. 1 is described as containing or being associated with a plurality of components, not all components illustrated within the example embodiment of FIG. 1 may be utilized in each alternative embodiment of the present disclosure. Additionally, one or more of the components described herein may be located external to environment 100, while in other instances, certain components may be included within or as a portion of one or more of the other described components, as well as other components not described. Further, certain components illustrated in FIG. 1 may be combined with other components, as well as used for alternative or additional purposes in addition to those purposes described herein.

Figure 2:
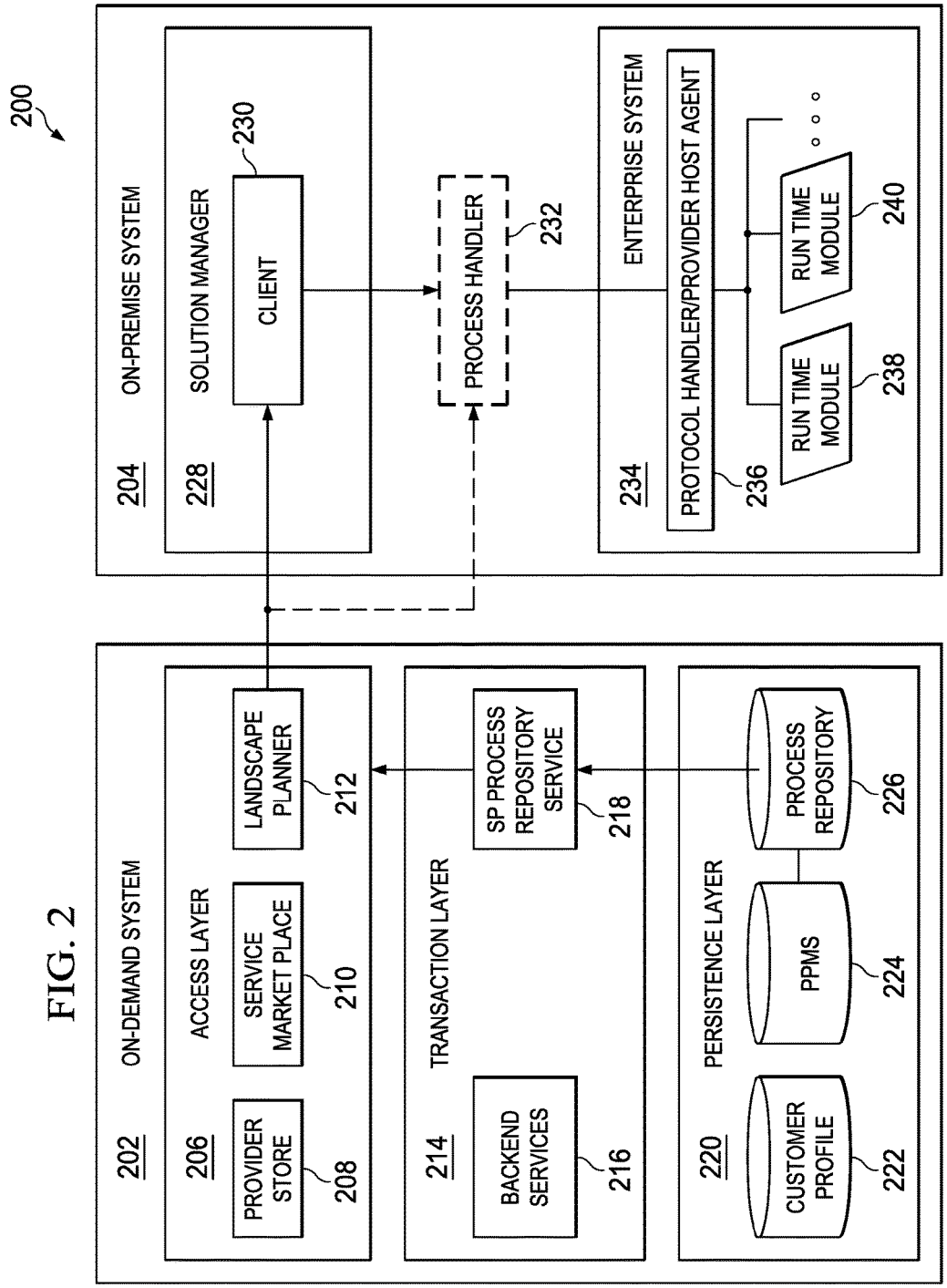
FIG. 2 is a schematic illustration of a data flow in an example architecture diagram that can be executed in accordance with embodiments of the present disclosure.

FIG. 2 illustrates an example data flow in an architecture diagram 200 that can be executed in accordance with embodiments of the present disclosure. For example, FIG. 2 illustrates a flow of data from an on-demand system 202 to an on-premise system 204. In some embodiments, the architecture diagram 200 can include operations that allow standardization of application maintenance processes. The architecture diagram 200 illustrates the communication between an on-demand system 202 and an on-premise system 204. The on-demand system 202 can include an access layer 206, a transaction layer 214 and a persistence layer 220. The access layer 206 includes a provider store 208, a service market place 210 and a landscape planner 212. The transaction layer includes a backend services module 216 (e.g. a maintenance optimizer) and a process repository service module 218. The persistence layer includes a customer profile 222, a product and production management system (PPMS) 224 and a process repository 226 (e.g. software logistics process repository). The on-premise system 204 includes a solution manager 228 and an enterprise system 234. The solution manager 228 includes a client 230 and a process handler 232. The enterprise system 234 includes a software logistics protocol handler/provider host agent 236.

The communication between the on-demand system 202 and the on-premise system 204 is controlled by the process handler 232. The process handler 232 can be implemented in an on-premise computing environment to provide a client (e.g., client 122 in FIG. 1) with an interface (e.g., interface 125 in FIG. 1) that abstracts the underlying complexity of dealing with multiple applications and/or runtimes across different logistics management processes. The process handler 232 can orchestrate multiple logistical steps (e.g., identifying the right content to use for a specific plan of the application maintenance process, where and how to download the content from, how to deploy the plan of the application maintenance process to the enterprise system, which application to use and how to trigger the application maintenance processes) to generate a standardized interaction with the client with minimal or, ideally, no media breaks. The process handler 232 communicates with the landscape planner 212, the client 230 and the enterprise system 234 to enable the masking of content. In some implementations, the enterprise system includes various multiple run times. For instance, the protocol handler/provider host agent 236 might access a plurality of run time modules (e.g., landscape management automaton, a task manager and other) 238 and 240 supporting a variety of applications (e.g., Java, in memory database, multi-headed applications etc.).

The access layer 206 can be an external interface accessible by a client at the on-premise computing environment. For example, the client can visit the provider store 208 and see the applications that are available for purchase. The provider store 208 can display multiple types of applications, which can be designed for particular platforms or can be compatible with multiple platforms (e.g., mobile applications, Linux, UNIX, Windows, Mac OS, etc.). The client may find an application of interest and use the landscape planner 212 to take an informed decision on whether or not to initiate the application maintenance process (e.g., installation, upgrade, etc.). The landscape planner 212 can identify and display the resources and changes required by the application maintenance process. For instance, the landscape planner 212 can generate the landscape plan containing the selected media, the associated tools and guides. The landscape planner 212 identifies the parameters by simulating the execution of the maintenance process using data retrieved from the SP process repository service 218. SP process repository service 218 retrieves the data from the process repository 226, which stores the metadata information about the application (e.g., mobile application, mobile solution, etc.) and mapping of content. The process repository 226 can extract additional information from PPMS 224 for particular applications. In some implementations, the transaction layer 214 and the persistence layer 220 can be implemented in the on-demand computing environment.

Figure 3:
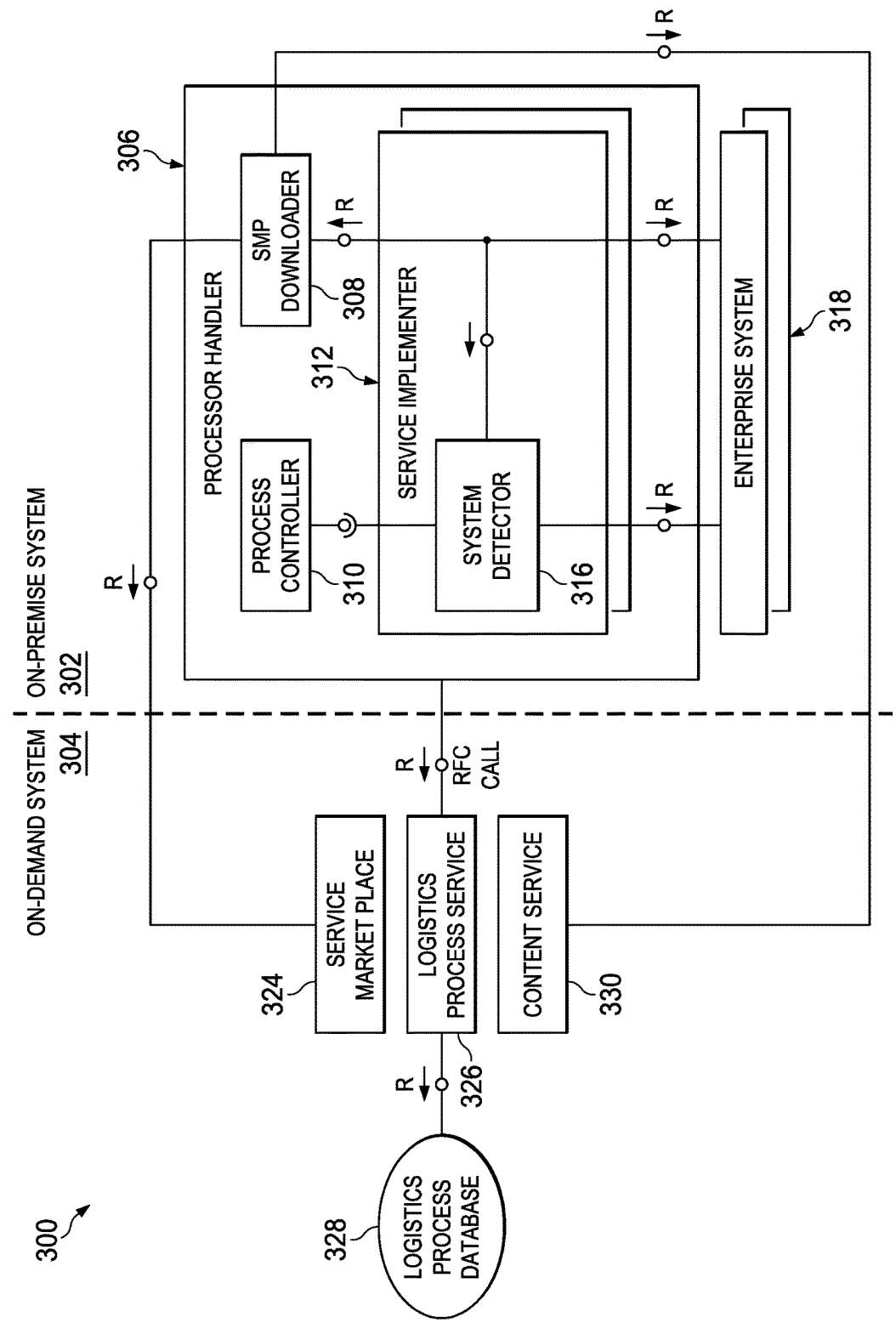
FIG. 3 is a schematic illustration of an example architecture diagram that can be executed in accordance with embodiments of the present disclosure.

FIG. 3 is a schematic illustration of an example architecture diagram 300 that can be used to execute the application maintenance process. The architecture diagram 300 MAY illustrate an example architecture that can be implemented at the on-premise system 302, which communicates with an on-demand system 304 (e.g., on-demand computing environment) to execute the application maintenance process. A core component of the architecture diagram 300 is the process handler 306 (which can be the process handler 232 in FIG. 2). The process handler 306 can include a service market place (SMP) downloader 308, a process controller 310 and a service implementer 312.

The service implementer 312 can communicate with other modules within the process handler 306 and the enterprise system 318 to call particular applications, to identify the current state of each particular application and to initiate the application maintenance process. The decision to initiate the application maintenance process is transmitted to the SMP downloader 308, which can identify the application maintenance process in the content service 330 and retrieve the content from SMP 324. The application maintenance process is executed by the process handler 306 according to a sequence. The application maintenance process sequence can be retrieved from the logistics processes database 328 over the logistics processes service module 326. The application maintenance process sequence can be controlled by the process controller 310, which communicates with the system detector 316. During each sequence of the application maintenance process, the system detector 316 can access the enterprise system 316 to identify which components of the enterprise system 316 can be maintained and which components of the enterprise system 316 require an update. For instance, the service implementer 312 can analyze the data retrieved by the system detector 316 to limit the download request to the components of the enterprise system 318, which are currently not at the latest version available.

Figure 4:
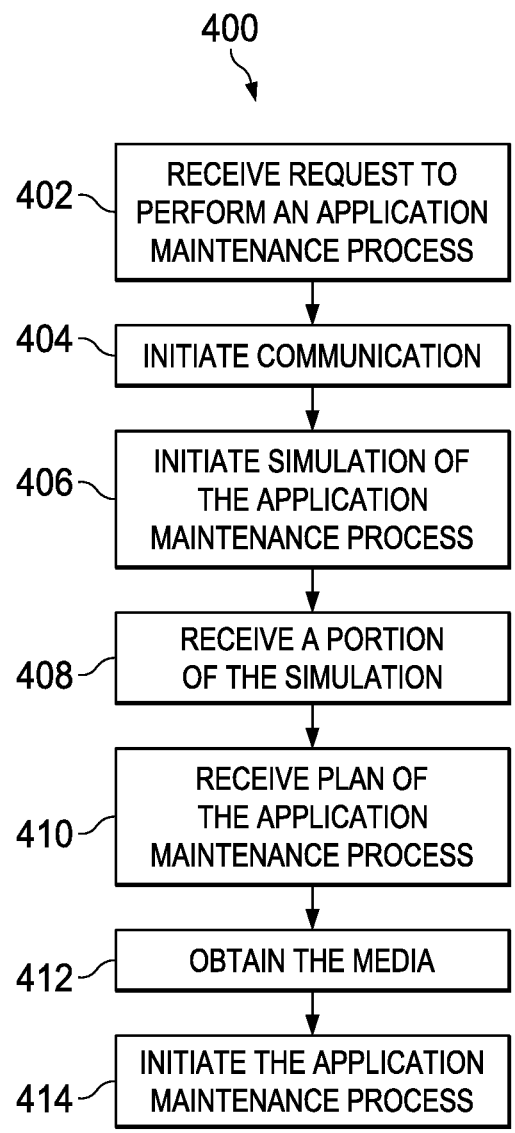
FIG. 4 is a flowchart depicting another example method that can be executed in accordance with embodiments of the present disclosure.

FIG. 4 illustrates a flowchart depicting an example method 400 that can be executed in accordance with embodiments of the present disclosure. The method 400 can be implemented in the systems 100, 200 and 300, discussed with reference to FIGS. 1-3, respectively. In some embodiments, the application maintenance process can be executed using the steps of method 400. The method 400 may allow a client to use a standard maintenance process protocol for various applications.

In step 402, an on-demand computing environment receives a request from a user in an on-premise computing environment to perform an application maintenance process for an application operable in the client landscape. For example, the user may request the installation or the update of an application, which can be downloaded from the on-demand computing environment.

In step 404, a communication to the on-demand computing environment is initiated. In some implementations, the communication includes a description of the application maintenance process. For instance, the description of the application maintenance process can include the application name, an application version, or an application service pack.

In step 406, the on-demand computing environment, in particular the landscape planner, can initiate a simulation of the application maintenance process. The simulation includes a description of one or more changes to the client landscape based on the application maintenance process.

In step 408, the on-premise computing environment receives the output of the simulation performed at step 406 or at least a portion of the simulation, indicating the changes associated with the application maintenance process.

In step 410, the on-premise computing environment receives from the on-demand computing environment a plan of the application maintenance process. In some implementations, the plan of the application maintenance process is generated by the landscape planner (212 in FIG. 2) and it is sent to the process handler (232 in FIG. 2). The plan can include one or more media, links to media and guides for completing the application maintenance process.

In step 412, the media is obtained through one or more links in the plan received at step 406. The process handler can process the plan by read the links to media and can initiate the download of the required media and/or guides.

In step 414, the application maintenance process is initiated in the on-premise computing environment by using at least a portion of the obtained media from the client landscape. The initiation of the application maintenance process can include a sequence of portions of the application maintenance process, each portion using a particular media retrieved from the client landscape.

In some embodiments, the method 400 can be a part of a solution manager providing multiple application maintenance services (e.g., download of archives, orchestration of multiple software logistics processes, retrieving reporting, monitoring information from enterprise systems, etc.). In some embodiments, the method 400 can be delivered as a standalone tool, which can be called by a software management tool (e.g., solution manager).

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method for managing application maintenance, comprising:
   receiving, from a user in an on-premise computing environment that comprises a client landscape, a request to perform an application maintenance process for an application operable in the client landscape;
   identifying an execution sequence associated with the application maintenance process by querying a state of the application;
   based on the identified sequence, identifying i) a first component of the on-premise computing environment that is to be maintained and ii) a second component of the on-premise computing environment that is to be updated;
   based on the identified first component and the identified second component, initiating a communication to an on-demand computing environment, the communication comprising a description of the application maintenance process that includes the state of the application;
   based on the description, accessing application settings stored in a database that are associated with the application, the application settings indicating a particular mode of operation;
   determining, at the on-demand computing environment, a plan of the application maintenance process based on the particular mode of operation;
   in response to the communication, initiating, at the on-demand computing environment, a simulation of the application maintenance process;
   based on the simulation, accessing a repository that provides access to media, wherein the simulation comprises a description of one or more changes to the client landscape based on the application maintenance process;
   based on the accessed repository, identifying a mapping between the application and media for completing the application maintenance process;
   receiving, at the on-premise computing environment and from the on-demand computing environment, a portion of the simulation and the plan of the application maintenance process, the plan comprising one or more links to the media for completing the application maintenance process based on the second component;
   obtaining the media through the one or more links in the plan; and
   initiating, at the on-premise computing environment, the application maintenance process based on the sequence, with each portion of the sequence of the application maintenance process associated with a particular media of the obtained media from the client landscape in the on-premise computing environment.

2. The computer-implemented method of claim 1, wherein the application maintenance process comprises at least one of an application installation process or an application update process.

3. The computer-implemented method of claim 2, wherein the description of the application maintenance process comprises at least one of an application name, an application version, or an application service pack.

4. The computer-implemented method of claim 1, wherein the plan is generated at the on-demand computing environment that comprises the repository that provides access to the media for completing the application maintenance process.

5. The computer-implemented method of claim 4, further comprising:
receiving at least a portion of the simulation at the on-premise computing environment.

6. The computer-implemented method of claim 1,
wherein querying the state of the application includes querying, with a process handler at the on-premise computing environment, the state of the application operable in the client landscape, and
wherein the one or more links to media for completing the application maintenance process are based on the state of the application.

7. The computer-implemented method of claim 1, wherein initiating the application maintenance process comprises initiating a first portion of the application maintenance process, the method further comprising:
initiating a second portion of the application maintenance process subsequent to the first portion with another portion of the obtained media from the client landscape in the on-premise computing environment.

8. A non-transitory computer storage medium encoded with a computer program, the program comprising instructions that when executed by one or more computers cause the one or more computers to perform operations comprising:
receiving a request to perform an application maintenance process for an application operable in a client landscape in an on-premise computing environment;
identifying an execution sequence associated with the application maintenance process by querying a state of the application;
based on the identified sequence, identifying i) a first component of the on-premise computing environment that is to be maintained and ii) a second component of the on-premise computing environment that is to be updated;
based on the identified first component and the identified second component, initiating a communication to an on-demand computing environment, the communication comprising a description of the application maintenance process that includes the state of the application;
based on the description, accessing application settings stored in a database that are associated with the application, the application settings indicating a particular mode of operation;
determining, at the on-demand computing environment, a plan of the application maintenance process based on the particular mode of operation;
in response to the communication, initiating, at the on-demand computing environment, a simulation of the application maintenance process;
based on the simulation, accessing a repository that provides access to media, wherein the simulation comprises a description of one or more changes to the client landscape based on the application maintenance process;
based on the accessed repository, identifying a mapping between the application and media for completing the application maintenance process;
receiving, at the on-premise computing environment and from the on-demand computing environment, a portion of the simulation and the plan of the application maintenance process, the plan comprising one or more links to the media for completing the application maintenance process based on the second component;
obtaining the media through the one or more links in the plan; and
initiating, at the on-premise computing environment, the application maintenance process based on the sequence, with each portion of the sequence of the application maintenance process associated with a particular media of the obtained media from the client landscape in the on-premise computing environment.

9. The non-transitory computer storage medium of claim 8, wherein the application maintenance process comprises at least one of an application installation process or an application update process.

10. The non-transitory computer storage medium of claim 9, wherein the description of the application maintenance process comprises at least one of an application name, an application version, or an application service pack.

11. The non-transitory computer storage medium of claim 8, wherein the plan is generated at the on-demand computing environment that comprises the repository that provides access to the media for completing the application maintenance process.

12. The non-transitory computer storage medium of claim 11, wherein the operations further comprise:
receiving at least a portion of the simulation at the on-premise computing environment.

13. The non-transitory computer storage medium of claim 8,
wherein querying the station of the application includes querying, with a process handler at the on-premise computing environment, the state of the application operable in the client landscape, and
wherein the one or more links to media for completing the application maintenance process are based on the state of the application.

14. The non-transitory computer storage medium of claim 8, wherein initiating the application maintenance process comprises initiating a first portion of the application maintenance process, and the operations further comprise:
initiating a second portion of the application maintenance process subsequent to the first portion with another portion of the obtained media from the client landscape in the on-premise computing environment.

15. A system of one or more computers configured to perform operations comprising:
receiving, from a user in an on-premise computing environment that comprises a client landscape, a request to perform an application maintenance process for an application operable in the client landscape, the request including a description of an application maintenance process;
identifying an execution sequence associated with the application maintenance process by querying a state of the application;
based on the identified sequence, identifying i) a first component of the on-premise computing environment that is to be maintained and ii) a second component of the on-premise computing environment that is to be updated;
based on the identified first component and the identified second component, initiating a communication to an on-demand computing environment, the communication comprising a description of the application maintenance process that includes the state of the application;

based on the description, accessing application settings stored in a database that are associated with the application, the application settings indicating a particular mode of operation;

determining, at the on-demand computing environment, a plan of the application maintenance process based on the particular mode of operation;

in response to the communication, initiating, at the on-demand computing environment, a simulation of the application maintenance process;

based on the simulation, accessing a repository that provides access to media, wherein the simulation comprises a description of one or more changes to the client landscape based on the application maintenance process;

based on the accessed repository, identifying a mapping between the application and media for completing the application maintenance process;

receiving, at the on-premise computing environment and from the on-demand computing environment, a portion of the simulation and the plan of the application maintenance process, the plan comprising one or more links to the media for completing the application maintenance process based on the second component;

obtaining the media through the one or more links in the plan; and initiating, at the on-premise computing environment, the application maintenance process based on the sequence, with each portion of the sequence of the application maintenance process associated with a particular media of the obtained media from the client landscape in the on-premise computing environment.

16. The system of claim 15, wherein the application maintenance process comprises at least one of an application installation process or an application update process.

17. The system of claim 16, wherein the description of the application maintenance process comprises at least one of an application name, an application version, or an application service pack.

18. The system of claim 15, wherein the plan is generated at the on-demand computing environment that comprises the repository that provides access to the media for completing the application maintenance process.

19. The system of claim 18, wherein the operations further comprise:

receiving at least a portion of the simulation at the on-premise computing environment.

20. The system of claim 19, wherein querying the station of the application includes querying, with a process handler at the on-premise computing environment, the state of the application operable in the client landscape, and wherein the one or more links to media for completing the application maintenance process are based on the state of the application.

21. The system of claim 15, wherein initiating the application maintenance process comprises initiating a first portion of the application maintenance process, and the operations further comprise:

initiating a second portion of the application maintenance process subsequent to the first portion with another portion of the obtained media from the client landscape in the on-premise computing environment.

* * * * *